United States Patent [19]

Spears

[11] Patent Number: 4,810,013

[45] Date of Patent: Mar. 7, 1989

[54] DOOR GUARD

[76] Inventor: Christopher L. Spears, 8345 Farley, Overland Park, Kans. 66212

[21] Appl. No.: 145,134

[22] Filed: Jan. 19, 1988

[51] Int. Cl.⁴ .............................................. B60R 13/04
[52] U.S. Cl. ..................................... 293/128; 280/770
[58] Field of Search ................. 293/128, 126; 280/770

[56] References Cited

U.S. PATENT DOCUMENTS

| | | | |
|---|---|---|---|
| 3,243,223 | 3/1966 | Hoshell | 293/128 |
| 3,659,887 | 5/1972 | Marquette | 292/128 |
| 4,002,363 | 1/1977 | James | 293/128 |
| 4,014,583 | 3/1977 | Forbes | 293/128 |
| 4,127,294 | 11/1978 | Cooper | 293/128 |
| 4,401,331 | 8/1983 | Ziner et al. | 293/128 |
| 4,498,697 | 2/1985 | McGlone et al. | 293/128 |
| 4,726,614 | 2/1988 | Myers et al. | 293/128 |

Primary Examiner—Robert R. Song
Attorney, Agent, or Firm—D. A. N. Chase; Joan O. Herman

[57] ABSTRACT

Removable door guard for use on an exterior portion of an automotive vehicle or the like to prevent damage to the exterior finish from objects such as the doors of adjacent automobiles. The door guard comprises at least two light-weight, elongated members joined together by resilient and nonresilient elements. Attachment means at both ends of the door guard arrangement are adapted to secure the door guard to the door of an autombile. When the door guard is attached to the door, the elongated members fit flush against the door, and the relative positioning of the resilient and nonresilient elements provides tension to positively retain the door guard in this position. The elongated members include a feature which allows the door guard to accommodate existing protective strips permanently attached to the exterior portion of the automoile. The door guard is easily put into a compacted arrangement for convenient storage.

8 Claims, 1 Drawing Sheet

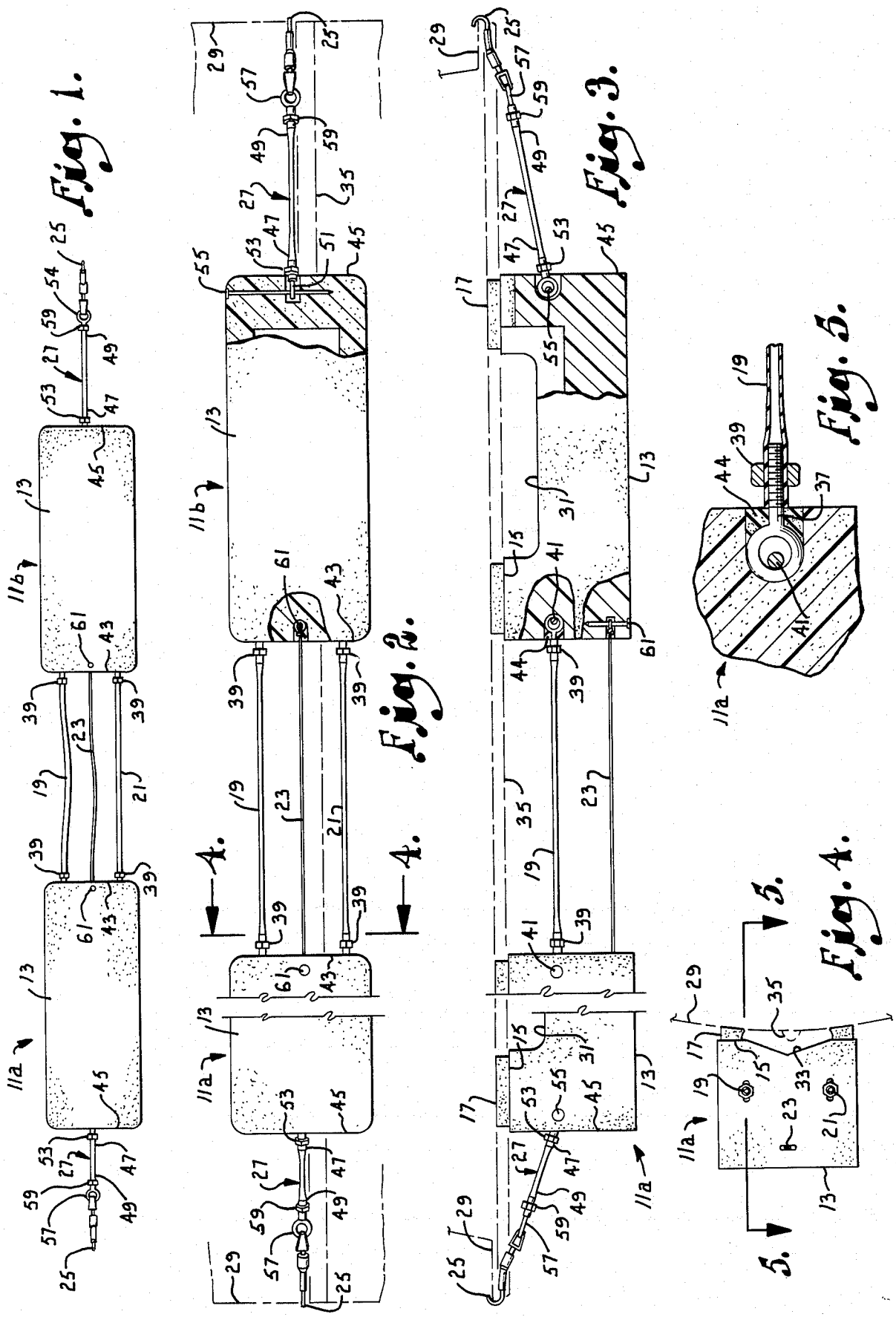

DOOR GUARD

BACKGROUND OF THE INVENTION

This invention relates to improvements in apparatus for protecting the exterior door portion of a vehicle from damage to the exterior finish caused by the doors of adjacent vehicles. This invention specifically relates to protective apparatus which may be demountably attached to the body of the vehicle.

It is well known by automobile owners that automobiles are often damaged in a parking lot situation when the door of one automobile is opened and comes in contact with the side of an adjacent automobile. The damage caused can include scratches, paint chips and dents. Although many automobiles are equipped with permanent molding strips, these strips are often of an inadequate width, or are positioned on the side of the automobile at a height selected for style rather than for functionality.

Several automobile protective devices are known in the art. Marquette U.S. Pat. No. 3,659,887 and McGlone U.S. Pat. No. 4,498,697 disclose devices which are detachably mounted on automobiles by magnetic means. Cooper U.S. Pat. No. 4,127,294 discloses the use of suction cups to attach a protective bumper to a vehicle. The magnets and the suction cups, however, may cause damage to the exterior finish of the vehicle. Other devices utilize complicated construction features, such as telescopic tubes, as in Ziner, et al., U.S. Pat. No. 4,401,331. Many known protective devices fail to take into account existing protective strips on automobiles and must be fitted above or below such strips. This may reduce the overall effectiveness of the protective devices. Also, many protective devices can slip or sag, thereby reducing their effectiveness.

OBJECTS OF THE INVENTION

It is, therefore, the primary object of the present invention to provide a new and improved door guard to protect the exterior finish of an automobile from the damage caused by opening doors of adjacent vehicles.

It is another object of the present invention to provide a door guard which can accommodate existing protective strips permanently attached to the exterior portion of an automobile.

It is a further object of the present invention to provide a door guard which is tensioned to fit flush against the exterior portion of an automobile.

It is a still further object of the present invention to provide a door guard which is tensioned to prevent the sagging which may be caused by the weight of the door guard when it is attached to the exterior portion of an automobile.

It is yet another object of the present invention to provide a door guard which is of durable yet lightweight construction, and which can be conveniently and compactly stored when not in use.

It is yet a further object of the present invention to provide a door guard which can prevent the accumulation of rain water on top of the door guard, and thereby prevent sagging which can reduce its effectiveness.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is an elevational view of the door guard of the present invention in an extended arrangement unattached to a vehicle.

FIG. 2 is a view similar to FIG. 1 on an enlarged scale showing the door guard in an extended arrangement as attached to the exterior door of an automobile, parts being broken away and shown in cross-section to reveal details of construction.

FIG. 3 is a top plan view of the door guard as shown in FIG. 2, parts also being broken away to show constructional details.

FIG. 4 is a cross-sectional view of the door guard of the present invention showing the relative positioning of the connecting elements, taken along line 4—4 of FIG. 2.

FIG. 5 is an enlarged, cross-sectional view of the door guard of the present invention showing the attachment means used to secure the connecting elements, taken along line 5—5 of FIG. 4.

DESCRIPTION OF THE PREFERRED EMBODIMENT

Referring now to FIGS. 1, 2 and 3, a door guard is shown which embodies the present invention. A pair of spaced, elongated members 11a and 11b are provided which are essentially rectangular blocks, each having an outer surface 13 and an inner surface 15 with damage preventing means such as foam padding 17 thereon. Any other suitable non-marring material may be used, although foam padding is preferred as it is porous and prevents water from being trapped between the exterior portion of the automobile and the inner surface 1 of the elongated members 11a and 11b. Trapped water can cause discoloration and separation of paint from the exterior portion of the automobile. The elongated members 11a and 11b are preferably constructed of lightweight yet durable material, such as Styrofoam ™. Although two elongated members are depicted in the drawings, this invention is not limited to two, but could be modified to include three or more elongated members.

The elongated members 11a and 11b are connected by a pair of flexible, resilient elements 19 and 21, and a third flexible, essentially non-resilient cord or string 23. The resilient elements 19 and 21 can be rubber tubing, as depicted in the drawings, or can be constructed of any other suitable elastic material. Resilient element 19 is slightly longer than resilient element 21 for reasons to be discussed below. Referring to FIG. 4, the resilient elements 19 and 21 are attached to the elongated members 11a and 11b at a position spaced evenly apart from a midpoint on each of the inner ends 43 of the elongated members 11a and 11b, and are positioned at an equal distance from the outer surface 13. The cord 23 is attached to the elongated members 11a and 11b at a position approximating the midpoint of each of the inner ends 43, and is positioned nearer the outer surface 13 than the resilient elements 19 and 21.

Hooks 25 are attached to the outer ends of the door guard arrangement by elastic means 27, for removably attaching the door guard to the exterior portion of a vehicle door 29 as depicted in FIGS. 2 and 3. The elastic means 27 for the hooks 25 are positioned adjacent the center of the elongated members 11a and 11b to allow attachment of the door guard to the automobile door without interference from any provided protective stripping, as described below.

Referring to FIG. 3, drainage passage 31 extends transversely within the inner surface 15 to prevent the accumulation of rain on top of the elongated members 11a and 11b, the additional weight of which can cause the door guard to sag and thereby reduce its effectiveness which is produced, in part, by the preselected positioning of the door guard on the vehicle door.

Referring to FIG. 4, the inner surface 15 has a longitudinally extending recess 33 therein providing a clearance to permit placement of the elongated members 11a and 11b over any protective strip 35 which may be provided on the exterior portion of the vehicle door 29. The recess 33 permits the elongates members and 11a and 11b to fit flush against the vehicle door 29 whether or not a protective strip 35 is provided. Furthermore, the relative positioning of the resilient elements 19 and 21 and the nonresilient cord 23 can be seen in FIG. 4.

Referring particularly to FIG. 5, the resilient elements 19 and 21, when made of rubber tubing, are attached to the elongated members 11a and 11b by placing the ends of the tubing over the screw portions of eyelet screws 37 and securing the tubing to the screws 37 with nuts 39. The eyelet portion of the screws 37 are secured within confronting inner end portions 43 of the adjacent elongated members 11a and 11b by adhesive means 44. Nails 41 are then driven partway through the eyelet portions of the screws 37 to further securely retain the screws 37 within the elongated members 11a and 11b.

The nonresilient cord 23 is attached at each of its ends to an inner end portion 43 of an elongated member 11a and 11b. Each end of the cord may be tied around a nail 61 which is emplaced within the corresponding elongated member 11a or 11b.

Each elastic means 27 may comprise a length of rubber tubing, as shown, and attaches the associated hook 25 to the adjacent end portion 45 of the respective elongated member 11a or 11b. The inner end 47 of each of the tubing portions is placed over the screw portion of an eyelet screw 51 and secured thereon by a nut 53. Similarly, the outer end 49 of each of the tubing portions is placed over a screw portion of an eyelet screw 57 and secured thereon by a nut 59. The eyelet portions of the eyelet screws 51 are then each secured within the outer end portions 45 of the elongated members 11a and 11b by a nail 55 driven partway through the eyelet portions. No adhesives are utilized for the hook attachment means, and the elastic means 27 are thus pivotally attached to each of the outer end portions 45.

In use, the door of the automobile to which the door guard is to be attached is opened. Each hook 25 is attached to an opposed edge of the automobile door, whereby the door guard is arranged in an extended position. When in this extended arrangement, the resilient elements 19 and 21 are slightly attenuated and thereby provide tension. If a protective strip is provided on the door, the hooks 25 are positioned above or below the existing strip. The door guard should be positioned so that the elongated members 11a and 11b fit flush against the automobile door, and the resilient elements 19 and 21 under tension serve to positively retain the door guard in this position. Bottom resilient element 21 is slightly shorter than top resilient element 19 to prevent the elongated members 11a and 11b from any sagging which may be caused by the weight of the members 11a and 11b, even though they are constructed of Styrofoam TM or another suitable lightweight material. The non-resilient cord 23 is positioned as described above to provide additional tension and prevent the elongated members 11a and 11b from buckling, thereby further assuring a flush fit against the automobile.

Clearance recess 33 is fitted over any protective strip which might be provided on the automobile door to prevent interference with the proper placement of the door guard. When the door guard is positioned on the door, the drainage passage 31 prevents rain from accumulating on top of the elongated members 11a and 11b, which would create sagging or displacement of the door guard and thereby reduce its effectiveness.

When not in use, the door guard can be put into a compacted arrangement for storage. The elongated members 11a and 11b may be placed side-by-side with either their respective outer surfaces 13 or inner surfaces 15 in contact to consume the least amount of space. The resilient elements 19 and 21 and the non-resilient cord 23 are all flexible, so no elastic deformation is required when folding the door guard into the compacted arrangement. The door guard may then be easily and conveniently stored in the automobile. The lightweight construction further enhances the convenience of storing this device.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A removable protective door guard for use on an exterior portion of an automotive vehicle or the like, comprising
   (a) a plurality of spaced, elongated members each having an outer surface and a spaced-apart inner surface adapted for contact with said exterior portion of the vehicle, and means thereon to prevent said inner surface from damaging the vehicle;
   (b) resilient means and non-resilient means connecting adjacent ends of said spaced elongated members to selectively provide an extended arrangement of said elongated members disposed in end-to-end alignment whereby said resilient members can be elastically deformed, and a compacted arrangement with said elongated members being stored alongside each other without elastic deformation of said resilient means;
   (c) means at opposed ends of said extended arrangement for removably attaching said door guard, while in said extended arrangement, to said exterior portion of the vehicle; and
   (d) said inner surface of each of said spaced elongated members having longitudinally extending clearance means therein to permit placement of said door guard over any existing protective strip located on said exterior portion of the automotive vehicle.

2. The door guard as set forth in claim 1, wherein said elongated members are generally rectangular in shape.

3. The door guard as set forth in claim 1, each of said inner surfaces having transversely extending drainage passage means therein.

4. The door guard as set forth in claim 3, wherein said drainage passage means includes an elongated arch, whereby when said door guard is attached to said exterior portion of the vehicle, said drainage passage means prevents accumulation of water or the like on said door guard.

5. The door guard as set forth in claim 1, wherein said damage preventing means includes padding.

6. The door guard as set forth in claim 1, wherein said resilient means comprises a pair of elastic elements attached at opposed ends to, and spaced evenly apart from a midpoint on, respective confronting ends of an adjacent pair of said spaced elongated members, and positioned at an equal distance from said outer surface, a bottom one of said elements being slightly shorter than a top one of said elements to thereby provide tension and prevent sagging of said elongated members when attached to said exterior portion of the vehicle.

7. The door guard as set forth in claim 1, wherein said non-resilient means comprises a non-elastic cord attached at opposed ends to a midpoint on respective confronting ends of an adjacent pair of spaced elongated members, and positioned nearer said outer surface than said resilient means to thereby provide tension and prevent buckling of said elongated members when attached to said exterior portion of the vehicle.

8. The door guard as set forth in claim 1, wherein said removable attachment means comprises a pair of hook means each attached to said elongated members at opposed ends of said extended arrangement by elastic means, each of said hook means adapted to engage an opposed edge of a vehicle door.

* * * * *